US011594724B2

(12) United States Patent
Takei et al.

(10) Patent No.: US 11,594,724 B2
(45) Date of Patent: Feb. 28, 2023

(54) POSITIVE ELECTRODE FOR LITHIUM ION SECONDARY CELL, AND LITHIUM ION SECONDARY CELL USING SAME

(71) Applicant: VEHICLE ENERGY JAPAN INC., Hitachinaka (JP)

(72) Inventors: Yuki Takei, Hitachinaka (JP); Shuichi Suzuki, Hitachinaka (JP); Takeshi Miki, Hitachinaka (JP); Hironori Sasaki, Hitachinaka (JP)

(73) Assignee: VEHICLE ENERGY JAPAN INC., Hitachinaka (JP)

( * ) Notice: Subject to any disclaimer, the term of this patent is extended or adjusted under 35 U.S.C. 154(b) by 329 days.

(21) Appl. No.: 16/954,285

(22) PCT Filed: Nov. 19, 2018

(86) PCT No.: PCT/JP2018/042605
§ 371 (c)(1),
(2) Date: Jun. 16, 2020

(87) PCT Pub. No.: WO2019/123932
PCT Pub. Date: Jun. 27, 2019

(65) Prior Publication Data
US 2021/0091379 A1 Mar. 25, 2021

(30) Foreign Application Priority Data
Dec. 20, 2017 (JP) .............................. JP2017-243821

(51) Int. Cl.
*H01M 4/36* (2006.01)
*H01M 4/13* (2010.01)
(Continued)

(52) U.S. Cl.
CPC ............. *H01M 4/366* (2013.01); *H01M 4/13* (2013.01); *H01M 4/625* (2013.01);
(Continued)

(58) Field of Classification Search
CPC ............. H01M 4/13; H01M 4/30; H01M 4/36; H01M 10/0525
See application file for complete search history.

(56) References Cited

U.S. PATENT DOCUMENTS

| 2015/0064556 A1 | 3/2015 | Lee | |
| 2016/0111225 A1* | 4/2016 | Hippchen | H01G 11/32 429/7 |
| 2018/0006291 A1* | 1/2018 | Kim | H01M 4/62 |

FOREIGN PATENT DOCUMENTS

| EP | 3 182 487 A1 | 6/2017 |
| JP | 2000-011995 A | 1/2000 |

(Continued)

OTHER PUBLICATIONS

International Search Report with English translation and Written Opinion issued in corresponding application No. PCT/JP2018/042605 dated Mar. 19, 2019.
(Continued)

*Primary Examiner* — Kenneth J Douyette
(74) *Attorney, Agent, or Firm* — Foley & Lardner LLP (57) ABSTRACT

Provided is a positive electrode for lithium ion secondary cell that includes an electrolyte holding layer excellent in electron conductivity, and a lithium ion secondary cell using the same. The present invention relates to a positive electrode for lithium ion secondary cell that includes a positive electrode current collector foil and positive electrode mixture layers laminated on both surfaces of the positive electrode current collector foil. The positive electrode mixture layer includes a first positive electrode active material layer, an electrolyte holding layer, and a second positive electrode active material layer. The first positive electrode active material layer, the electrolyte holding layer, and the second positive electrode active material layer contain positive electrode active materials, binders, and conductive agents
(Continued)

containing carbonaceous material. A conductive agent ratio of the electrolyte holding layer is higher than conductive agent ratios of the first positive electrode active material layer and the second positive electrode active material layer. A positive electrode active material ratio and a binder ratio of the electrolyte holding layer are lower than positive electrode active material ratios and binder ratios of the first positive electrode active material layer and the second positive electrode active material layer.

10 Claims, 5 Drawing Sheets

(51) Int. Cl.
    *H01M 4/62*     (2006.01)
    *H01M 10/0525*     (2010.01)
    *H01M 4/02*     (2006.01)

(52) U.S. Cl.
    CPC .. *H01M 10/0525* (2013.01); *H01M 2004/028* (2013.01); *H01M 2220/20* (2013.01)

(56) References Cited

FOREIGN PATENT DOCUMENTS

| | | |
|---|---|---|
| JP | 2014-035886 A | 2/2014 |
| JP | 2015-050189 A | 3/2015 |
| WO | WO-2016148383 A1 * | 9/2016 |

OTHER PUBLICATIONS

Extended European Search Report dated Sep. 15, 2021 in European Application No. 18890940.2.

* cited by examiner

POSITIVE ELECTRODE FOR LITHIUM ION SECONDARY CELL, AND LITHIUM ION SECONDARY CELL USING SAME

TECHNICAL FIELD

The present invention relates to a positive electrode for a lithium ion secondary cell and a lithium ion secondary cell using the same.

BACKGROUND ART

In the automotive industry, to conform to fuel consumption and environment regulations tightened in each country and each region, the technology development of automobiles that do not discharge carbon dioxide, for example, an electric vehicle that uses a battery as a power source and a fuel cell vehicle that uses hydrogen as a fuel source, has been attracting attention. However, there are problems of a charging infrastructure and a charging period for the electric vehicle, and there are problems of infrastructure maintenance of hydrogen stations and a battery cost for the fuel cell vehicle. Accordingly, to adapt to the fuel consumption and environmental regulations in a short period, automobiles that employ both an internal combustion engine and a battery as power sources, for example, a Plug-in Hybrid Electric Vehicle (PHEV) and a Hybrid Electric Vehicle (HEV), have still been strong candidates for the automobiles that emit less carbon dioxide.

A property required for a lithium ion secondary cell in thus HEV use is to be capable of supplying a large current necessary for driving a motor, that is, having a low internal resistance and a low voltage drop during electrical discharge.

For example, Patent Literature 1 discloses a negative electrode plate for secondary cell that includes a first negative electrode active material layer, a conductive layer, and a second negative electrode active material layer laminated in this order, in which the first negative electrode active material layer and the second negative electrode active material layer contain negative electrode active materials and binders, the conductive layer contains a conductive agent and another binder different from the binders contained in the first negative electrode active material layer and the second negative electrode active material layer, and the other binder contained in the conductive layer is large in tensile breaking strain and small in tensile modulus of elasticity compared with the binders contained in the first negative electrode active material layer and the second negative electrode active material layer. With the negative electrode plate for secondary cell, cycle characteristics can be improved even when negative electrode active material particles having large volume change are used.

Patent Literature 2 discloses an electrode for lithium ion secondary cell that includes a current collector, an electrode active material layer, and an electrolyte impregnation layer that contains an metal oxide and a conductive substance, in which the electrode active material layer includes a first electrode active material layer and a second electrode active material layer, and the electrolyte impregnation layer is positioned between the first electrode active material layer and the second electrode active material layer. With the electrode for lithium ion secondary cell, since an electrolyte can be smoothly supplied and impregnated into the electrode even if the electrode is thick, a lithium ion secondary cell excellent in cycle life characteristics and output characteristics is achieved.

CITATION LIST

Patent Literature

Patent Literature 1: JP 2014-035886 A
Patent Literature 2: JP 2015-050189 A

SUMMARY OF INVENTION

Technical Problem

In Patent Literature 1, since the conductive layer and each of the negative electrode active material layers contain the binders, and the binder in the conductive layer plays a role of suppressing expansion and contraction of the negative electrode active material layers, a binder concentration of the conductive layer possibly becomes higher than binder concentrations of the first negative electrode active material layer and the second negative electrode active material layer as described in its Examples. However, the binders contained in the respective layers of the electrodes are low in electron conductivity, thus possibly causing decrease of the electron conductivities of the electrodes when the concentrations become high.

Patent Literature 2 discloses that the electrolyte impregnation layer contains the metal oxide, and an impregnation capacity for electrolyte and a high electrical conductivity of the electrolyte impregnation layer improve the cycle life characteristics and the output characteristics of the lithium ion secondary cell. However, the metal oxide contained in the electrolyte impregnation layer is low in electron conductivity similarly to the binder, thus possibly causing decrease of the electron conductivities of the electrodes when the concentration becomes high. Patent Literature 2 does not disclose that the electrolyte impregnation layer contains a binder. When the electrolyte impregnation layer does not contain the binder, stresses on the electrodes in a cell manufacturing process (for example, winding process and cutting process) cause delamination of the layers, thereby possibly failing to provide the function required for the electrolyte impregnation layer.

In consideration of the conventional situation, the present invention has an object to provide a positive electrode for lithium ion secondary cell that includes an electrolyte holding layer excellent in electron conductivity and a lithium ion secondary cell using the same.

Solution to Problem

The inventors continued serious studies and consequently found that the above-described problems can be solved with a positive electrode for lithium ion secondary cell having the following features. The positive electrode for lithium ion secondary cell comprises a positive electrode current collector foil and positive electrode mixture layers laminated on both surfaces of the positive electrode current collector foil. The positive electrode mixture layer includes a first positive electrode active material layer, an electrolyte holding layer, and a second positive electrode active material layer. The first positive electrode active material layer, the electrolyte holding layer, and the second positive electrode active material layer contain positive electrode active materials, binders, and conductive agents containing carbonaceous material. A conductive agent ratio of the electrolyte holding layer is higher than conductive agent ratios of the first positive electrode active material layer and the second positive electrode active material layer. A positive electrode active material ratio and a binder ratio of the electrolyte holding layer are lower than positive electrode active material ratios and binder ratios of the first positive electrode active material layer and the second positive electrode active material layer. Thus, the inventors completed the invention.

Advantageous Effects of Invention

The present invention can improve the electron conductivity of the electrolyte holding layer in the positive electrode for lithium ion secondary cell. Problems, configurations, and effects other than ones described above will be clarified in the following explanation of embodiments.

DESCRIPTION OF EMBODIMENTS

The following describes the embodiment of the present invention using the drawings and the like. The following description indicates specific examples of the content of the present invention, the present invention is not limited thereto, and various changes and modifications by those skilled in the art can be made within the scope of the technical ideas disclosed in the Description. In all the drawings for describing the present invention, same reference numerals are attached to those having the same functions, and their repeated descriptions will be omitted in some cases.

Cell Structure

Figure 1:
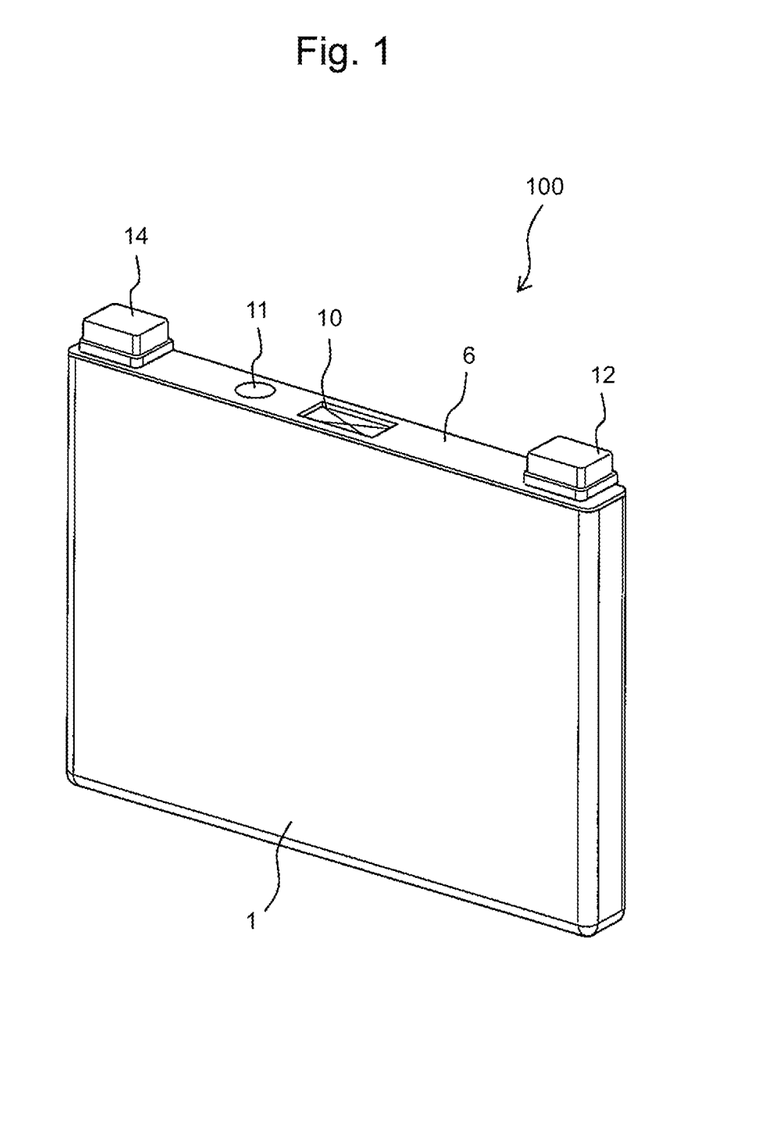
FIG. 1 is an external perspective view of a prismatic lithium ion secondary cell.
Figure 2:
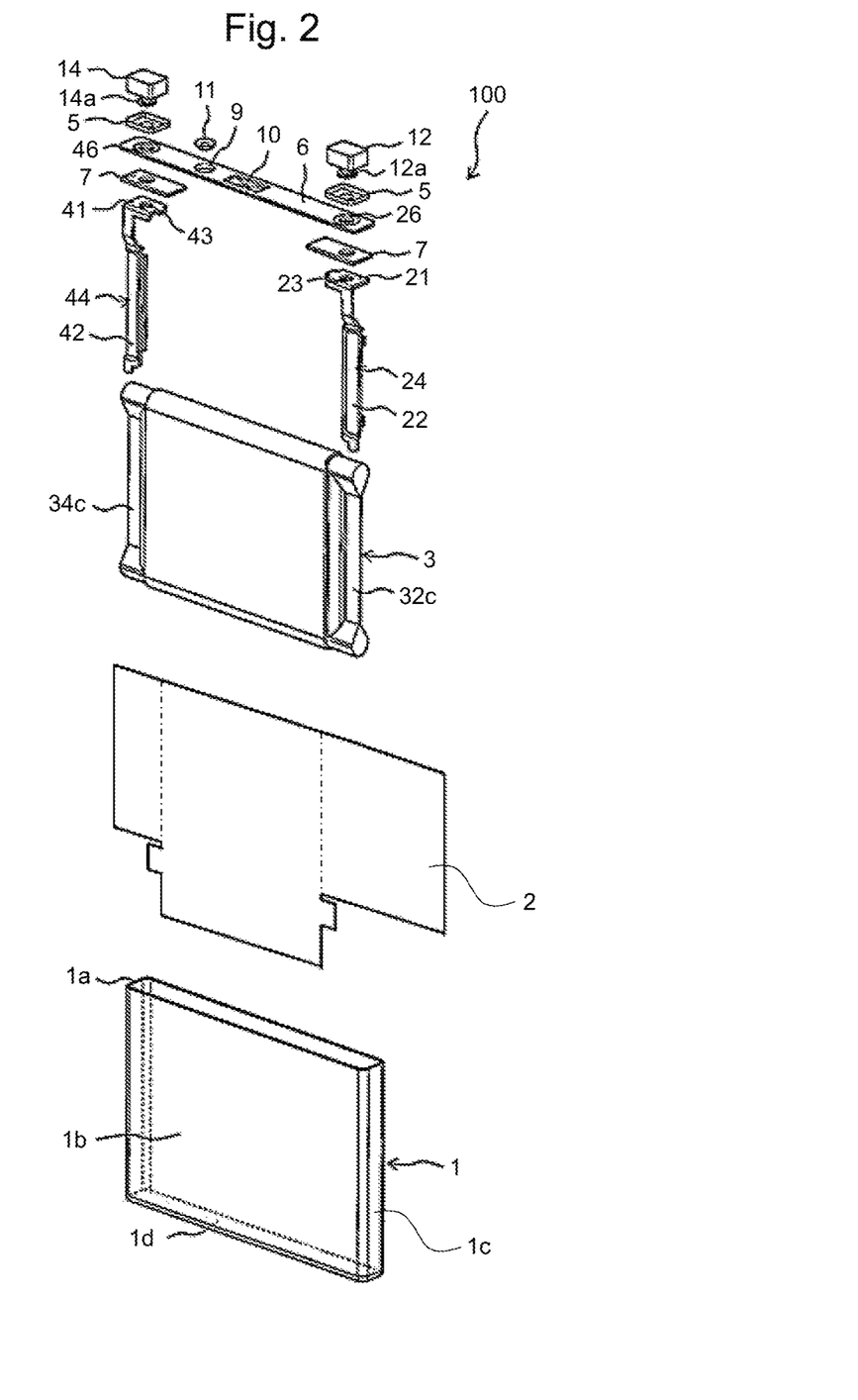
FIG. 2 is an exploded perspective view of the prismatic lithium ion secondary cell.

FIG. 1 is an external perspective view of a prismatic lithium ion secondary cell, and FIG. 2 is an exploded perspective view of the prismatic lithium ion secondary cell.

A prismatic lithium ion secondary cell 100 includes a cell can 1 and a cell lid 6. The cell can 1 has a rectangular bottom surface 1d, side surfaces, and an opening 1a. The side surfaces include a pair of opposing wide-width side surfaces 1b having relatively large areas and a pair of opposing narrow-width side surfaces 1c having relatively small areas, and the wide-width side surfaces 1b and the narrow-width side surfaces 1c stand upright from the bottom surface 1d. The opening 1a is open upward at upper ends of the side surfaces 1b, 1c.

The cell can 1 houses a wound group 3, and the opening 1a of the cell can 1 is sealed by the cell lid 6. The cell lid 6 has an approximately rectangular flat plate shape, and is welded so as to cover the opening 1a on the upper side of the cell can 1, thus sealing the cell can 1. The cell lid 6 is provided with a positive electrode external terminal 14 and a negative electrode external terminal 12. Via the positive electrode external terminal 14 and the negative electrode external terminal 12, the wound group 3 is charged, and an electric power is supplied to an external load.

The cell lid 6 integrally includes a gas discharge valve 10, and an increase of a pressure inside a cell container causes cleavage of the gas discharge valve 10 and discharges a gas from the inside, thus reducing the pressure inside the cell container. Accordingly, the safety of the prismatic lithium ion secondary cell 100 is ensured.

The cell can 1 houses the wound group 3 via an insulation protection film 2. Since the wound group 3 is wound in a flat shape, the wound group 3 has a pair of mutually opposing curving portions having semicircular shapes on a cross-sectional surface and planar portions continuously formed between the pair of curving portions. The wound group 3 is inserted into the cell can 1 from one curving portion side so as to have a winding axis direction along a lateral width direction of the cell can 1 and the other curving portion side is disposed on the upper opening side.

The wound group 3 includes a positive electrode current collector foil exposed portion 34c electrically connected to the positive electrode external terminal 14 disposed to the cell lid 6 via a positive electrode current collector plate 44. The wound group 3 includes a negative electrode current collector foil exposed portion 32c electrically connected to the negative electrode external terminal 12 disposed to the cell lid 6 via a negative electrode current collector plate 24. Accordingly, the electric power is supplied from the wound group 3 to the external load via the positive electrode current collector plate 44 and the negative electrode current collector plate 24, and an externally generated power is supplied to the wound group 3 and the wound group 3 is charged via the positive electrode current collector plate 44 and the negative electrode current collector plate 24.

The cell lid 6 is provided with insulating plates 7 and gaskets 5 to electrically insulate the positive electrode current collector plate 44 and negative electrode current collector plate 24, and the positive electrode external terminal 14 and negative electrode external terminal 12, from the cell lid 6, respectively.

Here, a material forming the positive electrode external terminal 14 and the positive electrode current collector plate 44 includes, for example, an aluminum alloy, and a material forming the negative electrode external terminal 12 and the negative electrode current collector plate 24 includes, for example, a copper alloy. A material forming the insulating plate 7 and the gasket 5 includes, for example, a resin material having an insulation property, such as polybutylene terephthalate, polyphenylene sulfide, and perfluoroalkoxy fluororesin.

The cell lid 6 is provided with a liquid injection port 9 drilled for injecting an electrolyte into the cell can 1, and the liquid injection port 9 is sealed by a liquid injection plug 11 after injecting the electrolyte into the cell can 1. The liquid injection plug 11 is joined to the cell lid 6 by laser beam welding to seal the liquid injection port 9, thus sealing the prismatic lithium ion secondary cell 100.

The positive electrode external terminal 14 and the negative electrode external terminal 12 include welded joint portions to be joined and welded to busbars and the like. The welded joint portion has a rectangular parallelepiped block shape projecting upward from the cell lid 6, and has a configuration where a lower surface is opposed to a surface of the cell lid 6 and an upper surface is approximately parallel to the cell lid 6 at a predetermined height position. The positive electrode external terminal 14 integrally includes a positive electrode connecting portion 14a electrically connected to the positive electrode current collector plate 44, and the negative electrode external terminal 12 integrally includes a negative electrode connecting portion 12*a* electrically connected to the negative electrode current collector plate 24.

The positive electrode connecting portion 14*a* and the negative electrode connecting portion 12*a* have columnar shapes that project from the lower surfaces of the positive electrode external terminal 14 and the negative electrode external terminal 12 and have distal ends insertable through a positive electrode side through hole 46 and a negative electrode side through hole 26 of the cell lid 6, respectively. The positive electrode connecting portion 14*a* and the negative electrode connecting portion 12*a* pass through the cell lid 6 and project into the inside of the cell can 1 with respect to a positive electrode current collector plate base portion 41 and a negative electrode current collector plate base portion 21 of the positive electrode current collector plate 44 and the negative electrode current collector plate 24. Distal ends of the positive electrode connecting portion 14*a* and the negative electrode connecting portion 12*a* are caulked to integrally secure the positive electrode external terminal 14, the negative electrode external terminal 12, the positive electrode current collector plate 44, and the negative electrode current collector plate 24 to the cell lid 6. The gaskets 5 are interposed between the positive electrode external terminal 14 and negative electrode external terminal 12 and the cell lid 6, and the insulating plates 7 are interposed between the positive electrode current collector plate 44 and negative electrode current collector plate 24 and the cell lid 6.

The positive electrode current collector plate 44 and the negative electrode current collector plate 24 include the positive electrode current collector plate base portion 41 and the negative electrode current collector plate base portion 21, and a positive electrode side connecting end portion 42 and a negative electrode side connecting end portion 22. The positive electrode current collector plate base portion 41 and the negative electrode current collector plate base portion 21 have rectangular plate shapes and are disposed to be opposed to the lower surface of the cell lid 6. The positive electrode side connecting end portion 42 and the negative electrode side connecting end portion 22 are bent at side ends of the positive electrode current collector plate base portion 41 and the negative electrode current collector plate base portion 21, extend along the wide-width side surface 1*b* of the cell can 1 toward the bottom surface 1*d* side, and are connected to the positive electrode current collector foil exposed portion 34*c* and the negative electrode current collector foil exposed portion 32*c* of the wound group 3 with being opposed and superimposed thereto. The positive electrode current collector plate base portion 41 and the negative electrode current collector plate base portion 21 are provided with a positive electrode side opening hole 43 and a negative electrode side opening hole 23 through which the positive electrode connecting portion 14*a* and the negative electrode connecting portion 12*a* are inserted, respectively.

Electrolyte

The electrolyte is injected into the cell can 1 through the liquid injection port 9. As the electrolyte injected into the cell can 1, for example, a nonaqueous electrolyte in which a lithium salt, such as lithium hexafluorophosphate (LiPF$_6$), is dissolved in a carbonate ester type organic solvent, such as ethylene carbonate, is applicable.

Insulation Protection Film

The insulation protection film 2 is wound around a peripheral area of the wound group 3 along a flat surface of the wound group 3 with an axis perpendicular to the winding axis of the wound group 3 as the central axis. The insulation protection film 2 is formed of one sheet or a plurality of film members made of synthetic resin, such as polypropylene (PP), and has a length capable of winding in a direction parallel to the flat surface of the wound group 3 with a direction perpendicular to the winding axis direction of the wound group 3 as the winding center.

Wound Group

Figure 3:
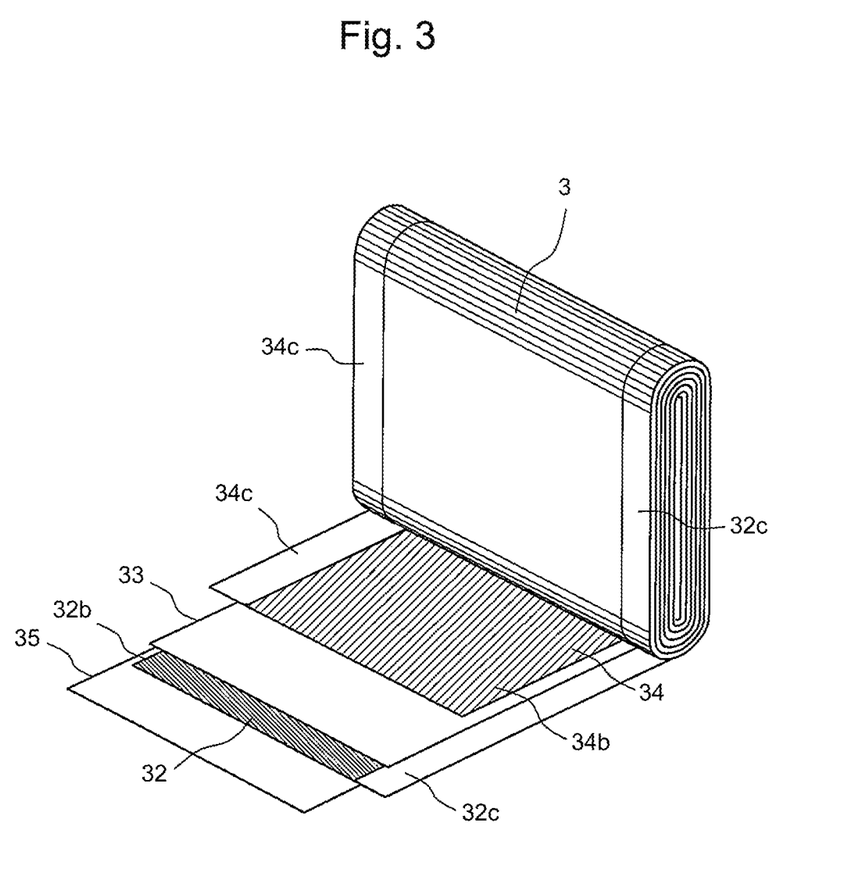
FIG. 3 is an exploded perspective view illustrating a developed state of a part of a wound group.

FIG. 3 is an exploded perspective view illustrating a developed state of a part of the wound group 3.

The wound group 3 is formed by winding in a flat shape while interposing separators 33, 35 between a negative electrode 32 and a positive electrode 34. In the wound group 3, the electrode on the outermost periphery is the negative electrode 32, and the separators 33, 35 are wound around further outside the negative electrode 32. The separators 33, 35 have a role of insulating between the positive electrode 34 and the negative electrode 32. A winding core can be disposed on the innermost periphery of the wound group 3 as necessary. As the winding core, for example, a winding core formed by winding a resin sheet having a flexural rigidity higher than that of any of a positive electrode current collector foil 34*a*, a negative electrode current collector foil (not illustrated), or the separators 33, 35 can be used.

A part of the negative electrode 32 over which negative electrode mixture layers 32*b* are applied is larger in the width direction than a part of the positive electrode 34 over which positive electrode mixture layers 34*b* are applied, thereby providing a configuration in which the part over which the positive electrode mixture layers 34*b* are applied is always sandwiched between the parts over which the negative electrode mixture layers 32*b* are applied. The positive electrode current collector foil exposed portion 34*c* and the negative electrode current collector foil exposed portion 32*c* are bundled at the planar portion and connected by welding and the like. While the separators 33, 35 are wider in the width direction than the part over which the negative electrode mixture layers 32*b* are applied, the separators 33, 35 does not obstruct the bundling and welding since the separators 33, 35 are wound around at the positions where the metal foil surfaces of the end portions are exposed on the positive electrode current collector foil exposed portion 34*c* and the negative electrode current collector foil exposed portion 32*c*.

The positive electrode 34 includes the positive electrode mixture layers 34*b* on both surfaces of the positive electrode current collector foil 34*a* as a positive electrode current collector, and includes the positive electrode current collector foil exposed portion 34*c*, where the positive electrode mixture layer 34*b* is not applied, on the end portion on one side in the width direction of the positive electrode current collector foil 34*a*.

The negative electrode 32 includes the negative electrode mixture layers 32*b* on both surfaces of the negative electrode current collector foil as a negative electrode current collector, and includes the negative electrode current collector foil exposed portion 32*c*, where the negative electrode mixture layer 32b is not applied, on the end portion on the other side in the width direction of the positive electrode current collector foil 34a. The positive electrode current collector foil exposed portion 34c and the negative electrode current collector foil exposed portion 32c are regions where the metal surfaces of the electrode foils are exposed, and wound around so as to be disposed at the positions on the one side and the other side in the winding axis direction.

Negative Electrode Mixture Layer

The negative electrode mixture layer 32b formed on the negative electrode 32 contains a negative electrode active material. As the negative electrode active material, a natural graphite into/from which lithium ion is insertable/removable, various artificial graphite materials, a carbonaceous material, such as coke, a compound of Si or Sn, and the like (SiO, $TiSi_2$, and the like), or a composite material of them are usable. As the particle shape of the negative electrode active material, a scaly (flaky) shape, a spherical shape, a fiber shape, a block shape, and the like are employable, and the particle shape is not specifically limited. While not limited, the concentration of the negative electrode active material is ordinarily 80% by weight or more relative to the total weight of the negative electrode mixture layer 32b.

The negative electrode mixture layer 32b formed on the negative electrode 32 contains a binder. As the binder, a polymer, such as polyvinylidene fluoride (PVDF), polytetrafluoroethylene (PTFE), polyethylene, polystyrene, polybutadiene, butyl rubber, nitrile rubber, styrene butadiene rubber, polysulfide rubber, nitrocellulose', cyanoethyl cellulose, various kinds of latex, acrylonitrile, vinyl fluoride, vinylidene fluoride, propylene fluoride, chloroprene fluoride, acrylic-based resin, and the like, and a mixture of them, and the like are usable. While not limited, the concentration of the binder is ordinarily 10% by weight or less relative to the total weight of the negative electrode mixture layer 32b.

The negative electrode mixture layer 32b formed on the negative electrode 32 contains a thickener. As the thickener, carboxymethyl cellulose is usable. While not limited, the concentration of the thickener is ordinarily 10% by weight or less relative to the total weight of the negative electrode mixture layer 32b.

While not limited, the total thickness of the negative electrode mixture layers 32b (that is, the total thickness of the negative electrode mixture layers 32b laminated on both surfaces of the negative electrode current collector foil) is ordinarily 50 μm to 200 μm as the thickness excluding the negative electrode current collector foil.

For example, the negative electrode 32 used in examples and comparative examples below includes the negative electrode current collector foil and the negative electrode mixture layers 32b laminated on both surfaces of the negative electrode current collector foil, and the negative electrode mixture layer 32b contains the negative electrode active material, the binder, and the thickener.

The negative electrode mixture layers 32b formed on the negative electrode 32 used in the examples and the comparative examples below were manufactured as follows. First, 1 parts by weight of styrene butadiene rubber as the binder and 1 parts by weight of carboxymethyl cellulose as the thickener were added to 98 parts by weight of natural graphite powder as the negative electrode active material, and pure water as a dispersing solvent was added thereto and kneaded, thereby manufacturing a negative electrode mixture. Subsequently, the negative electrode mixture was applied over both surfaces of a copper foil (negative electrode current collector foil) having the thickness of 10 μm excluding a welded portion (negative electrode current collector foil exposed portion 32c) by a slot-die coating method. Subsequently, drying, pressing, and cutting were performed, thus obtaining the negative electrode mixture layers 32b. The negative electrode mixture layers 32b formed on the negative electrode 32 were formed such that the total thickness of the negative electrode mixture layers 32b excluding the copper foil became 110 μm.

Positive Electrode Mixture Layer

Figure 4:
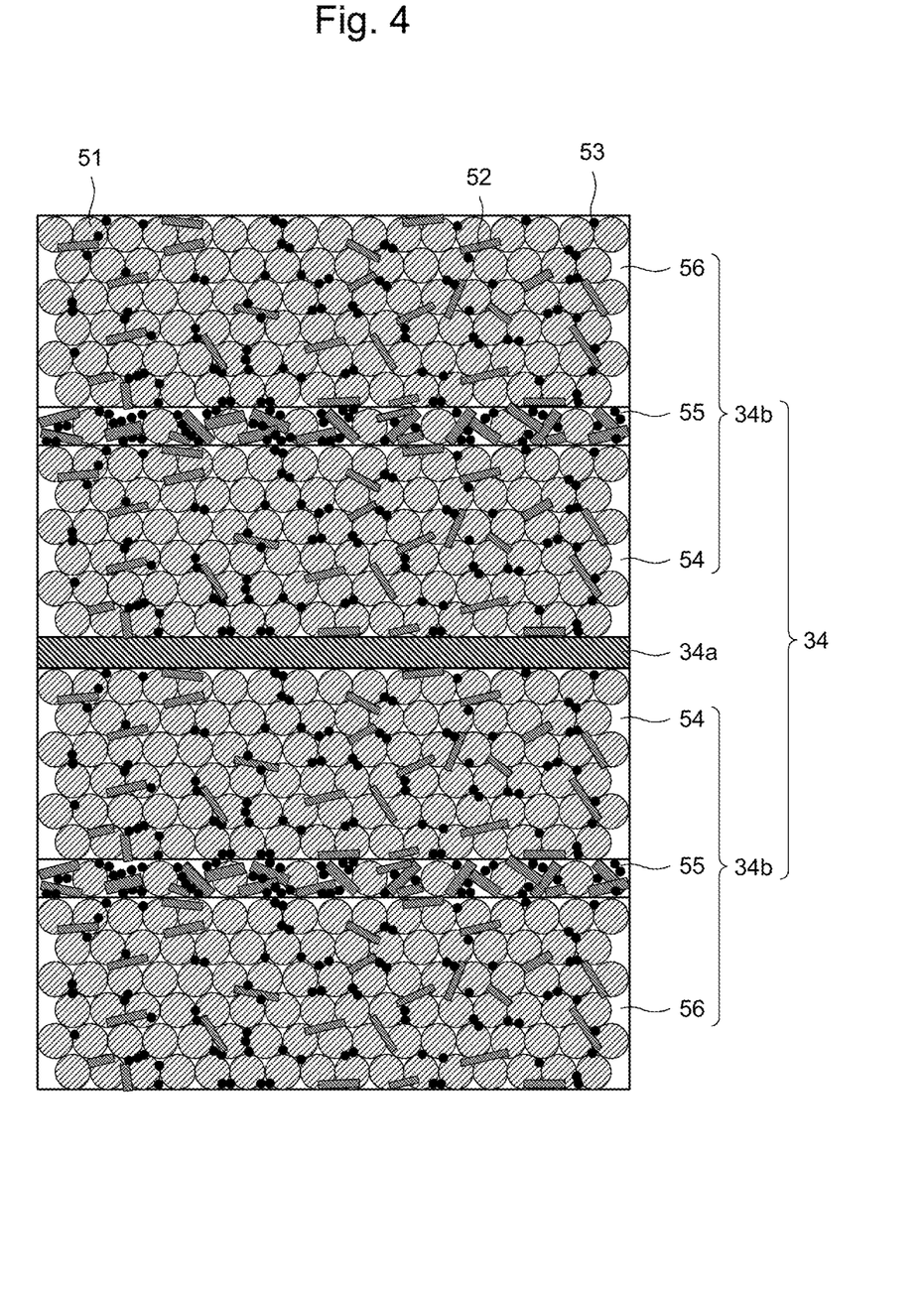
FIG. 4 is a cross-sectional view of a positive electrode.

FIG. 4 is a cross-sectional view of the positive electrode 34. The positive electrode 34 includes the positive electrode mixture layers 34b, in which a first positive electrode active material layer 54, an electrolyte holding layer 55, and a second positive electrode active material layer 56 are laminated in this order on both surfaces of the positive electrode current collector foil 34a (that is, the positive electrode mixture layer 34b means a layer where the first positive electrode active material layer 54, the electrolyte holding layer 55, and the second positive electrode active material layer 56 are joined). The first positive electrode active material layer 54, the electrolyte holding layer 55, and the second positive electrode active material layer 56 each contain a positive electrode active material 51, a binder (not illustrated), and a conductive agent containing carbonaceous material, such as a crystalline carbon 52 and an amorphous carbon 53.

Since the positive electrode mixture layer includes the electrolyte holding layer 55 between the first positive electrode active material layer 54 and the second positive electrode active material layer 56, the carbonaceous materials, such as the crystalline carbon 52 and the amorphous carbon 53, contained in the conductive agent in the electrolyte holding layer 55 hold the electrolyte, and the electrolyte is supplied to the first positive electrode active material layer 54 and the second positive electrode active material layer 56 from the electrolyte holding layer 55 during electrical discharge. Consequently, an ionic conductivity of the positive electrode mixture layer 34b is improved, thus ensuring suppression of a voltage drop during a large current discharge.

As the positive electrode active material 51, a lithium manganate, another lithium manganate that has a spinel crystal structure, a lithium manganese composite oxide in which a part of the lithium, manganate is replaced or doped with a metallic element, a lithium cobaltate or a lithium titanate that has a layered crystal structure, a lithium-metal composite oxide in which a part of the lithium cobaltate or the lithium titanate is replaced or doped with a metallic element, and the like are usable.

As the binder, the binder same as that used in the negative electrode mixture layer 32b is usable.

As the carbonaceous material in the conductive agent containing carbonaceous material, the crystalline carbon 52, the amorphous carbon 53, and the like are usable. As the crystalline carbon 52, while not limited, a scaly graphite, for example, an artificial graphite, a natural graphite, or a mixture of them can be used. As the amorphous carbon 53, while not limited, a carbon black, such as, acetylene black, ketjen black, channel black, furnace black, lamp black, thermal black, or a mixture of them can be used.

As the conductive agent containing carbonaceous material, the crystalline carbon 52 and the amorphous carbon 53 are preferably used. By using the crystalline carbon 52 and the amorphous carbon 53 as the conductive agent containing carbonaceous material, a high electron conductivity can be ensured.

The concentrations of the respective materials are not limited insofar as a conductive agent ratio of the electrolyte holding layer 55 is higher than conductive agent ratios of the first positive electrode active material layer 54 and the second positive electrode active material layer 56, and a positive electrode active material ratio and a binder ratio of the electrolyte holding layer 55 are lower than positive electrode active material ratios and binder ratios of the first positive electrode active material layer 54 and the second positive electrode active material layer 56. However, the concentrations of the respective materials are ordinarily in following ranges.

The concentration of the conductive agent of the electrolyte holding layer 55 is ordinarily 45% by weight or more and preferably 50% by weight or more, relative to the total weight of the electrolyte holding layer 55.

The concentration of the conductive agent of the first positive electrode active material layer 54 or the second positive electrode active material layer 56 is ordinarily 15% by weight or less and preferably 10% by weight or less, relative to the total weight of the first positive electrode active material layer 54 or the second positive electrode active material layer 56.

The concentration of the positive electrode active material 51 of the electrolyte holding layer 55 is preferably 45% by weight or less relative to the total weight of the electrolyte holding layer 55.

The concentration of the positive electrode active material 51 of the first positive electrode active material layer 54 or the second positive electrode active material layer 56 is ordinarily 70% by weight or more and preferably 80% by weight or more, relative to the total weight of the first positive electrode active material layer 54 or the second positive electrode active material layer 56.

The concentration of the binder of the electrolyte holding layer 55 is ordinarily 10% by weight or less and preferably 5% by weight or less, relative to the total weight of the electrolyte holding layer 55.

The concentration of the binder of the first positive electrode active material layer 54 or the second positive electrode active material layer 56 is ordinarily 15% by weight or less and preferably 10% by weight or less, relative to the total weight of the first positive electrode active material layer 54 or the second positive electrode active material layer 56.

The concentrations of the conductive agent, the positive electrode active material 51, and the binder may be same between the first positive electrode active material layer 54 and the second positive electrode active material layer 56.

Since the conductive agent ratio of the electrolyte holding layer 55 contributing to the improvement of the electron conductivity is higher than the conductive agent ratios of the first positive electrode active material layer 54 and the second positive electrode active material layer 56, and the positive electrode active material ratio and the binder ratio of the electrolyte holding layer 55 possibly hindering the electron conductivity are lower than the positive electrode active material ratios and the binder ratios of the first positive electrode active material layer 54 and the second positive electrode active material layer 56, the electron conductivity in the positive electrode mixture layer 34b is improved.

The total thickness of the positive electrode mixture layers 34b (total thickness of the positive electrode mixture layers 34b laminated on both surfaces of the positive electrode current collector foil 34a) is, while not limited, ordinarily 50 μm to 200 μm as the thickness excluding the positive electrode current collector foil 34a. At this time, the thicknesses of the first positive electrode active material layer 54 and the second positive electrode active material layer 56 are ordinarily each 10 μm to 45 μm in one layer on one surface, and the thickness of the electrolyte holding layer 55 is ordinarily 5 μm to 15 μm in one layer on one surface.

For example, the positive electrode 34 used in Example 1 below includes the positive electrode current collector foil 34a and the positive electrode mixture layers 34b, in which the first positive electrode active material layer 54, the electrolyte holding layer 55, and the second positive electrode active material layer 56 are laminated in this order on both surfaces of the positive electrode current collector foil 34a. The first positive electrode active material layer 54, the electrolyte holding layer 55, and the second positive electrode active material layer 56 each contain the positive electrode active material 51, the binder, and the conductive agent containing carbonaceous material. The conductive agent contains the scaly graphite as the crystalline carbon 52 and the acetylene black as the amorphous carbon 53.

The positive electrode mixture layers 34b formed on the positive electrode 34 used in Example 1 below were manufactured as follows. First, 10 parts by weight of PVDF as the binder, and 5 parts by weight of scaly graphite and 5 parts by weight of acetylene black as the conductive agent containing carbonaceous material were added to 100 parts by weight of lithium manganate (chemical formula $LiMn_2O_4$) as the positive electrode active material 51, and NMP as a dispersing solvent was added thereto and kneaded, thereby manufacturing a positive electrode mixture A for the first positive electrode active material layer 54 and the second positive electrode active material layer 56. Subsequently, 5 parts by weight of PVDF as the binder, and 25 parts by weight of scaly graphite and 25 parts by weight of acetylene black as the conductive agent containing carbonaceous material were added to 45 parts by weight of lithium manganate (chemical formula $LiMn_2O_4$) as the positive electrode active material 51, and NMP as a dispersing solvent was added thereto and kneaded, thereby manufacturing a positive electrode mixture B for the electrolyte holding layer 55. Subsequently, the positive electrode mixture A and the positive electrode mixture B were applied over both surfaces of an aluminum foil (positive electrode current collector foil 34a) having the thickness of 15 μm excluding a welded portion (positive electrode current collector foil exposed portion 34c) by a slot-die coating method such that the positive electrode mixture layers 34b, in which the first positive electrode active material layers 54, the electrolyte holding layers 55, and the second positive electrode active material layers 56 were laminated in this order, were simultaneously formed. Subsequently, drying, pressing, and cutting were performed, thus obtaining the positive electrode mixture layers 34b. The positive electrode mixture layers 34b formed on the positive electrode 34 were manufactured such that the total thickness of the positive electrode mixture layers 34b excluding the aluminum foil became 100 μm. At this time, the thicknesses of the first positive electrode active material layer 54 and the second positive electrode active material layer 56 were each 20 μm in one layer on one surface, and the thickness of the electrolyte holding layer 55 was 10 μm in one layer on one surface.

While the wound group 3 was formed in the flat shape in the embodiment described above, various shape may be employed, for example, a wound group wound in any shape, such as a cylindrical shape. The shape of the cell can 1 may be, for example, a cylindrical shape in addition to the prismatic shape described above.

EXAMPLES

While the following further specifically describes the present invention using examples and comparative examples, the present invention is not limited thereto.

Example 1

The lithium ion secondary cell was manufactured according to the method described in the above embodiment.

Example 2

The lithium ion secondary cell was manufactured by the method similar to that of Example 1 excluding that the part "the positive electrode mixture A and the positive electrode mixture B were applied over both surfaces of an aluminum foil (positive electrode current collector foil 34a) having the thickness of 15 μm excluding a welded portion (positive electrode current collector foil exposed portion 34c) by a slot-die coating method such that the positive electrode mixture layers 34b, in which the first positive electrode active material layers 54, the electrolyte holding layers 55, and the second positive electrode active material layers 56 were laminated in this order were simultaneously formed. Subsequently, drying, pressing, and cutting were performed, thus obtaining the positive electrode mixture layers 34b" in the method for manufacturing the positive electrode mixture layers 34b formed on the positive electrode 34 in Example 1 was changed to "first, the positive electrode mixture A was used to apply the first positive electrode active material layers 54 over both surfaces of an aluminum foil (positive electrode current collector foil 34a) having the thickness of 15 μm excluding a welded portion (positive electrode current collector foil exposed portion 34c), and dried. Subsequently, the positive electrode mixture B was used to apply the electrolyte holding layers 55 over the two layers of the first positive electrode active material layer 54 formed to sandwich the aluminum foil, and dried. Furthermore, the positive electrode mixture A was used to apply the second positive electrode active material layers 56 over the two layers of the electrolyte holding layer 55 formed to sandwich the aluminum foil and the two-layers of the first positive electrode active material layer 54, and dried. Subsequently, pressing and cutting were performed, thus obtaining the positive electrode mixture layers 34b."

Comparative Example 1

The lithium ion secondary cell was manufactured by the method similar to that of Example 1 excluding that the method for manufacturing the positive electrode mixture layers 34b formed on the positive electrode 34 in Example 1 was changed to "first, 10 parts by weight of PVDF as the binder, and 5 parts by weight of scaly graphite and 5 parts by weight of acetylene black as the conductive agent containing carbonaceous material were added to 100 parts by weight of lithium manganate (chemical formula $LiMn_2O_4$) as the positive electrode active material 51, and NMP as a dispersing solvent was added thereto and kneaded, thereby manufacturing a positive electrode mixture. Subsequently, the positive electrode mixture was applied over both surfaces of an aluminum foil (positive electrode current collector foil 34a) having the thickness of 15 μm excluding a welded portion (positive electrode current collector foil exposed portion 34c) by a slot-die coating method. Subsequently, drying, pressing, and cutting were performed, thus obtaining the positive electrode mixture layers 34b. The positive electrode mixture layers 34b formed on the positive electrode 34 were manufactured such that the total thickness of the positive electrode mixture layers 34b excluding the aluminum foil became 100 μm".

Comparative Example 2

The lithium ion secondary cell was manufactured by the method similar to that of Example 1 excluding that in the method for manufacturing the positive electrode mixture layers 34b formed on the positive electrode 34 in Example 1, the positive electrode mixture B for the electrolyte holding layer 55 was changed to a positive electrode mixture B for the electrolyte holding layer 55 manufactured by adding 20 parts by weight of PVDF as the binder, and 5 parts by weight of scaly graphite and 5 parts by weight of acetylene black as the conductive agent containing carbonaceous material to 70 parts by weight of lithium manganate (chemical formula $LiMn_2O_4$) as the positive electrode active material 51, and adding NMP as a dispersing solvent thereto and kneading.

Comparative Example 3

The lithium ion secondary cell was manufactured by the method similar to that of Example 2 excluding that in the method for manufacturing the positive electrode mixture layers 34b formed on the positive electrode 34 in Example 2, the positive electrode mixture B for the electrolyte holding layer 55 was changed to a positive electrode mixture B for the electrolyte holding layer 55 manufactured by adding 10 parts by weight of acetylene black as the conductive agent containing carbonaceous material to 100 parts by weight of manganese oxide as a metal oxide, and adding NMP as a dispersing solvent thereto and kneading.

Evaluation: Large Current Discharge Characteristics

Figure 5:
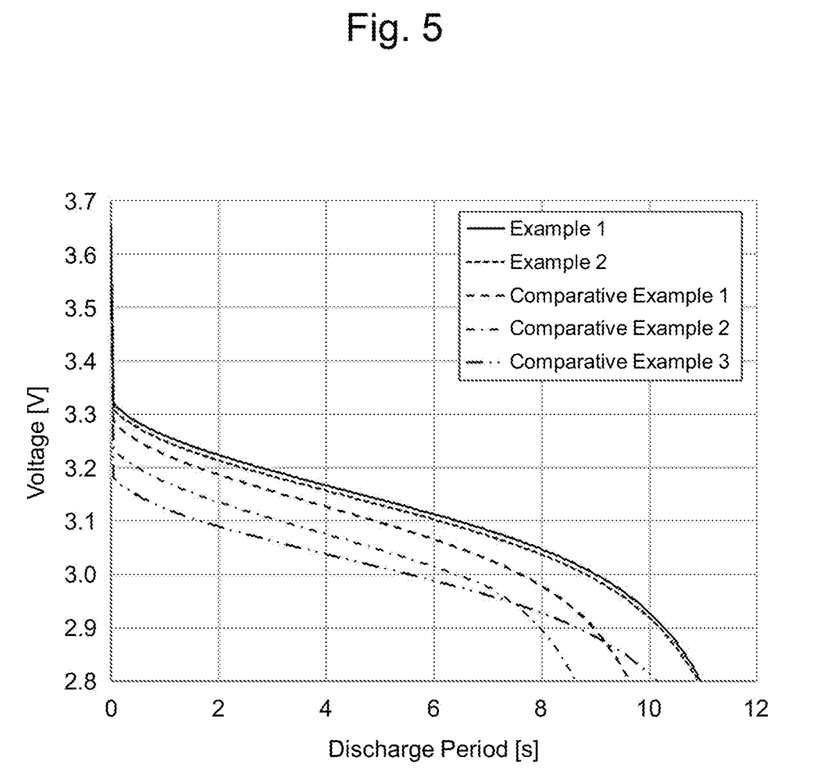
FIG. 5 is a graph illustrating discharge voltage characteristics of the lithium ion secondary cells in Examples 1 and 2 and Comparative Examples 1 to 3.

The lithium ion secondary cells manufactured in Examples 1 and 2 and Comparative Examples 1 to 3 were adjusted to SOC 50% under a condition of 25° C., and voltages during discharge of 200 A were measured under the condition of 25° C. FIG. 5 illustrates the results.

FIG. 5 is a graph illustrating discharge voltage characteristics of the lithium ion secondary cells manufactured in Examples 1 and 2 and Comparative Examples to 3.

From the test results of FIG. 5, Examples 1 and 2 were high in voltage immediately after the start of discharge by about 20 mV to 140 mV compared with Comparative Examples 1 to 3, and it was found that the electron conductivity in the positive electrode mixture layer 34b was improved. Examples 1 and 2 kept the high voltages even after the discharge compared with Comparative Examples 1 to 3 and the discharge periods of Examples 1 and 2 were extended by about one second to three seconds compared with those of Comparative Examples 1 to 3, and it was found that the ionic conductivity in the positive electrode mixture layer 34b was improved due to the electrolyte supplied from the electrolyte holding layer 55.

The present invention is not limited to the embodiment described above but includes various modifications. For example, for a part of the configuration of the embodiment, another configuration can be added, deleted, or replaced.

REFERENCE SIGNS LIST

1 Cell can
1*a* Opening
1*b* Wide-width side surface
1*c* Narrow-width side surface
1*d* Bottom surface
2 Insulation protection film
3 Wound group
5 Gasket
6 Cell lid
7 Insulating plate
9 Liquid injection port
10 Gas discharge valve
11 Liquid injection plug
12 Negative electrode external terminal
12*a* Negative electrode connecting portion
14 Positive electrode external terminal
14*a* Positive electrode connecting portion
21 Negative electrode current collector plate base portion
22 Negative electrode side connecting end portion
23 Negative electrode side opening hole
24 Negative electrode current collector plate
26 Negative electrode side through hole
32 Negative electrode
32*b* Negative electrode mixture layer
32*c* Negative electrode current collector foil exposed portion
33 Separator
34 Positive electrode
34*a* Positive electrode current collector foil
34*b* Positive electrode mixture layer
34*c* Positive electrode current collector foil exposed portion
35 Separator
41 Positive electrode current collector plate base portion
42 Positive electrode side connecting end portion
43 Positive electrode side opening hole
44 Positive electrode current collector plate
46 Positive electrode side through hole
51 Positive electrode active material
52 Crystalline carbon
53 Amorphous carbon
54 First positive electrode active material layer
55 Electrolyte holding layer
56 Second positive electrode active material layer
100 Prismatic lithium ion secondary cell

The invention claimed is:

1. A positive electrode for lithium ion secondary cell, comprising:
a positive electrode current collector foil; and
positive electrode mixture layers laminated on both surfaces of the positive electrode current collector foil, each positive electrode mixture layer including a first positive electrode active material layer, an electrolyte holding layer, and a second positive electrode active material layer,
wherein the first positive electrode active material layer, the electrolyte holding layer, and the second positive electrode active material layer contain positive electrode active materials, binders, and conductive agents containing carbonaceous material,
wherein a conductive agent ratio by weight of the electrolyte holding layer is higher than conductive agent ratios by weight of the first positive electrode active material layer and the second positive electrode active material layer, and
wherein a positive electrode active material ratio by weight and a binder ratio by weight of the electrolyte holding layer are lower than positive electrode active material ratios by weight and binder ratios by weight of the first positive electrode active material layer and the second positive electrode active material layer.

2. The positive electrode for lithium ion secondary cell according to claim 1,
wherein the electrolyte holding layer contains the conductive agent in an amount of 50% by weight or more relative to a total weight of the electrolyte holding layer, the binder in an amount of 5% by weight or less relative to the total weight of the electrolyte holding layer, and the positive electrode active material in an amount of 45% by weight or less relative to the total weight of the electrolyte holding layer.

3. The positive electrode for lithium ion secondary cell according to claim 1,
wherein each positive electrode mixture layer includes the first positive electrode active material layer on the positive electrode current collector foil, the electrolyte holding layer on the first positive electrode active material layer, and the second positive electrode active material layer on the electrolyte holding layer.

4. The positive electrode for lithium ion secondary cell according to claim 1,
wherein the conductive agent contains a crystalline carbon and an amorphous carbon.

5. The positive electrode for lithium ion secondary cell according to claim 4,
wherein the crystalline carbon is an artificial graphite, a natural graphite, or a mixture thereof, and the amorphous carbon is one or more carbon blacks selected from the group consisting of acetylene black, ketjen black, channel black, furnace black, lamp black, and thermal black, or a mixture thereof.

6. A lithium ion secondary cell that includes the positive electrode for lithium ion secondary cell according to claim 1, a negative electrode, a separator, and an electrolyte.

7. A lithium ion secondary cell that includes the positive electrode for lithium ion secondary cell according to claim 2, a negative electrode, a separator, and an electrolyte.

8. A lithium ion secondary cell that includes the positive electrode for lithium ion secondary cell according to claim 3, a negative electrode, a separator, and an electrolyte.

9. A lithium ion secondary cell that includes the positive electrode for lithium ion secondary cell according to claim 4, a negative electrode, a separator, and an electrolyte.

10. A lithium ion secondary cell that includes the positive electrode for lithium ion secondary cell according to claim 5, a negative electrode, a separator, and an electrolyte.

* * * * *